Sept. 30, 1930.    H. J. HULL    1,776,909
CLAW FOR MILKING MACHINES
Filed Jan. 15, 1930
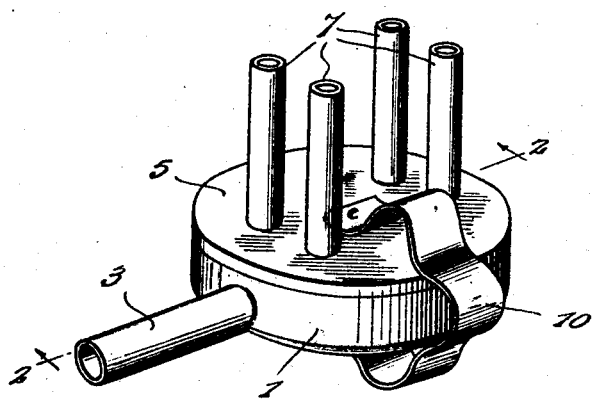
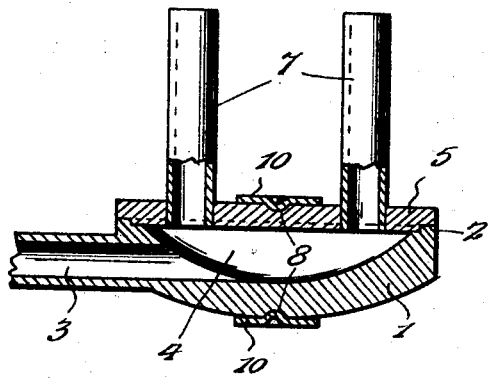 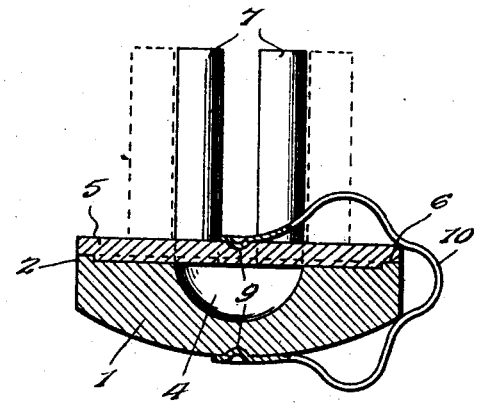
Inventor
H. J. Hull.
By Lacey & Lacey,
Attorneys Patented Sept. 30, 1930

1,776,909

UNITED STATES PATENT OFFICE

HOWARD J. HULL, OF LANCASTER, PENNSYLVANIA

CLAW FOR MILKING MACHINES

Application filed January 15, 1930. Serial No. 421,032.

The object of this invention is to provide a simple device to be interposed between the teat cups of a milking machine and the suction hose and so constructed that it may be set to permit flow from the cups to the vacuum chamber of the milking apparatus or set so as to cut off such flow and thereby prevent the entrance of foreign matter into the milk receptacle. The invention seeks to provide a device for the stated purpose which may be produced at a low cost, may be easily manipulated and will be efficient in operation. The invention is illustrated in the accompanying drawing and will be hereinafter fully set forth.

In the drawing:

Figure 1 is a perspective view of a claw constructed according to the present invention, Fig. 2 is a vertical section on the line 2—2 of Fig. 1, and Fig. 3 is a vertical section taken at right angles to Fig. 2.

In carrying out the invention, there is provided a body 1 which is preferably circular and is provided on its upper side with a marginal flange 2. The body is also provided at one point with a radially extending nipple 3 to which the end of the suction hose is to be fitted and the bore of said nipple leads from a recess or chamber 4 in the upper side of the body having a concave floor or bottom, as clearly shown in Figs. 2 and 3. There has also been provided an upper plate or cover 5 in the form of a disk having its under side rabbeted at its margin, as shown at 6, whereby it may fit closely within the flange 2 of the body and seat firmly on the upper side of the body, these opposed surfaces being finished so as to provide a ground joint and prevent leakage without requiring the use of packing. Rising from the disk or cover 5 are a plurality of nipples 7 to which the teat cups are to be fitted and these nipples are so disposed that in one position of the cover they will communicate with the recess or chamber 4 while in another position they will be blanked or closed by the upper side of the body, the working position of the nipples being indicated by the full lines in Figs. 2 and 3, while the closed inoperative position is indicated by the dotted lines in Fig. 3. Located centrally in the upper side of the cover and the under side of the body are sockets or indentations 8 in which are engaged the projections 9 on the ends of a spring 10 which is of a general U-shape and is adapted to span the device, as shown in Figs. 1 and 3, whereby its ends will exert pressure upon the top of the cover and the bottom of the body to hold the same in close engagement. The bosses or projections 9 engaged in the sockets 8 constitute pivots about which the spring may turn with the cover when the cover is to be shifted to bring the nipple 7 into an inoperative position.

From the foregoing description, taken in connection with the accompanying drawing, the use and advantages of the device will, it is thought, be readily understood. The milking machine is operated in the usual manner and suction is created from the teat cups through the nipples 7 and the nipple 8 to the milk receptacle of the machine. As long as the device is adjusted as shown in Figs. 1 and 2 and by the full lines in Fig. 3 there will be a steady flow from the cups to the receptacle. When the milking operation has been finished, the cover or upper disk is given a quarter turn, thereby bringing the nipple 7 into the position shown by the dotted lines in Fig. 3 and cutting off further flow. Experience has shown that, when the teat cups are removed from the udder and the operation of the milking apparatus has theoretically stopped, there is a strong flow through the teat cups to the milk receptacle so that insects and particles of dust and dirt are drawn into the receptacle and lessen the commercial value of the milk. The present device overcomes this difficulty in a very simple manner and with a construction that is very inexpensive. The holding spring 10 serves as a clip to firmly retain the parts in operative relation but at the same time may be very easily disengaged from the device, whereupon the cover may be lifted from the body and access obtained to the interior of all the parts so that they may be thoroughly cleaned.

Having thus described the invention, I claim:

1. A claw for milking machines comprising a body, a nipple extending from said body to be coupled to the suction hose of the milking machine, a cover resting on said body and rotatable thereon, nipples rising from the cover to be engaged with the teat cups of a milking machine, and means for yieldably holding the cover to the body whereby the cover may be shifted to cut off the flow.

2. A claw for milking machines comprising a body having a recess in its upper side and a nipple leading from said recess to be coupled to the suction hose of a milking machine, a cover resting on the body and rotatable thereon, nipples rising from the cover and disposed to communicate with the recess in the body in one position of the cover and to be closed by the body at the sides of said recess in another position of the cover, and means for holding the cover in close engagement with the body.

3. A claw for milking machines comprising a body having a recess in its upper side and a nipple leading from said recess to be coupled to the suction hose of a milking machine, a cover resting rotatably on the body and forming a ground joint therewith, nipples rising from the cover to be coupled to the teat cups of a milking machine and disposed to communicate with the recess in the body in one position of the cover and to be closed by the body at the sides of the recess in another position of the cover, and a spring clip fitted over the edge of the cover and the body and yieldably holding the cover upon the body.

4. A claw for milking machines comprising a body having a recess in its upper side and a nipple leading from said recess, the body being further provided with a central socket on its under side, a cover resting on the body and having a central socket in its upper side, nipples rising from the cover to be coupled to the teat cups of a milking machine and arranged to communicate with the recess in the body in one position of the over and to be closed by the body in another position of the cover, and a spring clip fitting over the edge of the cover and the body and provided at its ends with opposed projections engaging in the socket in the cover and the body respectively.

5. A claw for milking machines comprising a body to be coupled to the suction hose of a milking machine, and a cover resting on the body to be coupled to the teat cups of a milking machine, the cover and the body having passages therethrough to establish communication between the teat cups and the suction hose and the cover being relatively movable to open or close said passages.

In testimony whereof I affix my signature.

HOWARD J. HULL. [L. S.]